United States Patent Office 3,336,266
Patented Aug. 15, 1967

3,336,266
EPOXIDIZED 4-METHYLENECYCLOHEX-ANEMETHYL ESTERS AND RESINS THEREFROM
Wayne V. McConnell and William H. Moore, Kingsport, Tenn., assignors to Eastman Kodak Company, Rochester, N.Y., a corporation of New Jersey
No Drawing. Original application Nov. 7, 1962, Ser. No. 236,136, now Patent No. 3,288,814, dated Nov. 29, 1966. Divided and this application Mar. 14, 1966, Ser. No. 594,285
4 Claims. (Cl. 260—78.4)

This application is a division of copending application Ser. No. 236,136, filed Nov. 7, 1962, now Patent No. 3,288,814.

This invention relates to a new class of epoxides, to resins prepared therefrom, and to the production of these compounds.

The new epoxides of the invention may be represented by the following general structures:

(I)     $R(COOA)_n$
(II)    $R_1(COOA)_n$
(III)   $R_2(COOA)_2$
(IV)    $R_3(COOA)_2$
(V)     $R_4(COOA)_2$ and (VI)    $R_5(COOA)_2$ wherein each $n$ represents an integer of from 2–4, each A represents the group:

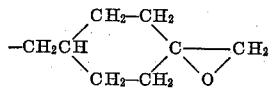

R represents a polyvalent benzene nucleus, $R_1$ represents a polyvalent cyclohexane nucleus, $R_2$ represents a divalent cyclohexane nucleus containing an epoxy group on vicinal ring carbons for example, a 7-oxabicyclo[4.1.0]heptane nucleus, $R_3$ represents a divalent alkylene group of from 2–12 carbon atoms, e.g. —$C_2H_4$—, —$C_3H_6$—, —$C_4H_8$—, —$C_{12}H_{24}$—, etc. groups, $R_4$ represents a divalent alkylene group of from 2–8 carbon atoms interrupted by an —O— linkage, i.e. a group represented by —$R_6$—O—$R_6$— wherein each $R_6$ contains from 1–4 carbon atoms such as —$CH_2$—O—$CH_2$—, —$C_2H_4$—O—$C_2H_4$—, —$CH_2$—O—$C_2H_4$—, —$C_4H_8$—O—$C_4H_8$—, etc. groups, and $R_5$ represents the group —CH=CH— in either cis or trans forms. The above defined-epoxides are all useful as plasticizers and stabilizers for various polymeric materials, e.g. for halogen-containing polymers such as poly(vinyl chloride) and for cellulose esters such as cellulose acetate butyrate. They also constitute an especially useful class of intermediates for the production of a wide range of epoxy resins which are especially adapted for use as adhesives, laminates, and for coating and encapsulating applications and casting.

It is, accordingly, an object of the invention to provide a new class of epoxide monomers. Another object is to provide epoxy resins therefrom. Another object is to provide processes for preparing the above compounds. Other objects will become apparent from the description and examples.

In accordance with the invention, we prepare our new epoxides by the epoxidation of esters prepared from 4-methylenecyclohexanemethanol of the structure:

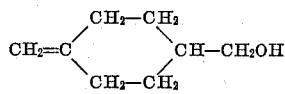

and appropriate polybasic acids. The reactions may be illustrated by the following general equations:

ESTERIFICATION

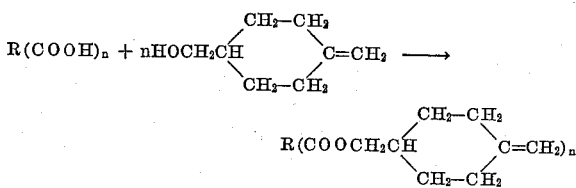

EPOXIDATION

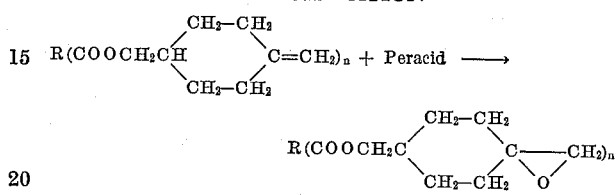

It will be understood that R can be substituted in the above equations by $R_1$, $R_2$, $R_3$, $R_4$ or $R_5$, all of which have been previously defined. The esterification step is preferably carried out by heating a mixture of the alcohol and the acid using titanium alcoholates as catalysts, preferably titanium butoxide. The alcohol is used in amount equal to or slightly in excess of that required to esterify all of the carboxylic groups, i.e. approximately 1 mole of the alcohol for each carboxylic group. The amount of the catalyst can vary from about 0.005–2% based on the total weight of the alcohol and acid. Advantageously, the reaction is conducted in a high-boiling inert solvent medium, for example, in xylene. The ester product can then be recovered by conventional separation means. The 4-methylenecyclohexanedimethanol may be prepared by the pyrolysis of 1,4-cyclohexanedimethanol or of a diester of this diol. Reference may also be had to the procedure described by G. A. Haggis et al., J. Chem. Soc., 1953, pages 404–407, for preparing the above intermediate. For the epoxidation step, a percarboxylic acid such as perpropionic acid, perbutyric acid, perbenzoic acid, etc., is employed, but preferably peracetic acid in an amount of approximately 1 mole of the acid per methylene group contained in the ester to be epoxidized. The peracetic acid is added dropwise to the ester, which is maintained at a temperature of from 25–50° C. An inert solvent, for example such as chloroform, may be used with advantage as the reaction medium. The epoxide products are recovered from the reaction mixture by washing with water and distilling off the low-boiling materials under reduced pressure.

Suitable polybasic acids for the esterification step with the 4-methylenecyclohexanemethanol include those of the general formulas $R(COOH)_n$, $R_1(COOH)_n$, $R_2(COOH)_2$ $R_3(COOH)_2$, $R_4(COOH)_2$ and $R_5(COOH)_2$, for example, aromatic acids, for example, orthophthalic, trimellitic, pyromellitic, etc. acids, alicyclic acids such as, for example, 1,2-cyclohexanedicarboxylic, 1,4-cyclohexanedicarboxylic, 1,2,3-cyclohexanetricarboxylic, 1,2,3,4-cyclohexanetetracarboxylic, 4,5 - epoxy - 1,2-cyclohexanedicarboxylic, etc. acids, alkanedioic acids such as, for example, oxalic, malonic, succinic, glutaric, adipic, pimelic, suberic, sebacic, dodecandioic, etc. acids, dibasic ether acids, such as for example, diglycolic, etc. acids, and alkenedioic acids such as, for example, maleic and fumaric acids. The polybasic acids can be used as convenient in their free acid or anhydride forms or in some cases as lower alkyl esters or acid chlorides thereof.

To obtain the epoxy resins of the invention, the epoxides prepared as above described are heated with amines or with acid anhydrides. Useful resin compositions are obtained with amines when the epoxide compound is mixed in such proportions as to provide from 0.7 to 2.0 amino hydrogens for each epoxy group of the epoxide. With anhydrides, useful compositions are obtained from mixtures containing from 0.5 to 3.0 anhydride carbonyl groups for each epoxy group. A polyol is customarily employed with the anhydride in an amount of about from 1–2%, based on the total weight of the epoxide compound and the anhydride. Well known anhydrides that are useful in forming the above resins include phthalic, tetrahydrophthalic, 1,2-cyclohexanedicarboxylic anhydrides, etc., and chlorinated derivatives of phthalic anhydride. Mono- and dibasic acids may also be used in the resin making compositions in place of the hydroxy compounds and the anhydrides. The properties of the resin may be modified by curing or postcuring at temperatures from about 50–200° C., or by varying the ratios of the resin components. Suitable polyols include any of the known diols, triols, etc., for example ethylene glycol, trimethylene glycol, tetramethylene glycol, pentamethylene glycol, 1,2,6-hexanetriol, cyclohexanedimethanol, pentaerythritol, and the like. Suitable polyamines include ethylenediamine, hexamethylenediamine, diethylenetriamine, triethylenetetramine, cyclohexanebismethylamine, etc.

tion temperatures in the range of 140°–200° C. lead to products of good color and give practical reaction rates with titanium alkoxide catalyst. Titanium butoxide is an excellent catalyst for the reaction at a concentration level of 0.005–0.1%. Higher concentrations may be used but are generally unnecessary. The use of other similar titanium compounds and tin compounds which are effective in catalyzing this reaction are well known to those skilled in the art. Azeotroping solvents other than xylene can be used or the reaction may be carried out in the absence of solvents. Thus, the phthalic anhydride in the above examples can be substituted in like or equivalent amount by any of the polybasic acids mentioned as being suitable in the above esterification process. Thus, terephthalic, trimellitic, pyromellitic, adipic, 1,2-cyclohexanedicarboxylic, 4,5 - epoxy-1,2-cyclohexanedicarboxylic, fumaric, maleic, etc. acids, for example, will give the corresponding ester products.

It is understood that the familiar ester interchange reactions are also suitable, and are sometimes preferable for the preparation of the unsaturated esters. This is illustrated, for example, by the reaction of dimethyl terephthalate with 4-methylenecyclohexanemethanol in the presence of catalysts such as those described above to give the desired unsaturated ester.

*Example 2.—Diepoxide of 4-methylenecyclohexanemethyl terephthalate*

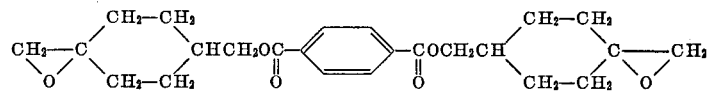

The following examples will serve to illustrate further the manner of practicing the invention.

*Example 1.—4-Methylenecyclohexanemethyl phthalate*

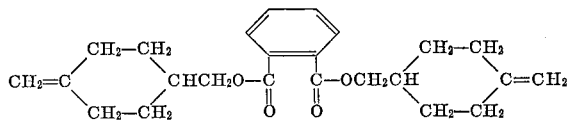

A mixture of phthalic anhydride (222 g., 1.5 moles), 4-methylenecyclohexanemethanol (403 g., 3.2 moles), xylene (300 ml.), and titanium butoxide (0.1 g.) was refluxed and the water formed during the reaction was removed using a suitable trap. A 15-in. fractionating column, packed with glass rings, was placed between the pot and the trap. The column had sufficient pressure drop to bring the pot temperature to 160°–170° C. during the reflux period. After 10 hours, 27 ml. of water had been collected and the residual acidity was 0.7% (calculated as phthalic acid). The mixture was allowed to cool and 700 ml. of hexane was then added. The solution was neutralized with 5% sodium bicarbonate solution and was then washed with two 1000-ml. portions of water. The low boilers were distilled by heating up to 150° C. at atmospheric pressure; their removal was completed by gradually reducing the pressure to 1 mm. and raising the temperature to 175° C. The residue (556 g., 97% conversion) was 4-methylenecyclohexanemethyl phthalate of sufficient purity for the subsequent epoxidation process and for the preparation of the desired resins.

The above example is to be considered illustrative of the preparation of the other intermediate unsaturated esters coming within the scope of the invention. The conditions may be varied to some extent. For example, reac- A mixture of 4 - methylenecyclohexanemethyl terephthalate (38 g., 0.1 mole), chloroform (100 ml.), and sodium acetate (2 g.) was stirred while adding dropwise 38 g. (0.20 mole) of a 40% acetic acid solution of peracetic acid over a period of 45 min. The temperature was maintained at 20°–28° C. using external cooling as necessary during the addition of the peracetic acid and for 2 hr. thereafter. At this time, more than 95% of the peracetic acid had reacted. The mixture was washed with 100 ml. of water and was then neutralized with 5% sodium bicarbonate solution. The chloroform was removed under reduced pressures leaving the solid epoxy ester. The product weighed 35 g. and was found to contain 7.0% oxirane oxygen. The calculated value for oxirane oxygen in bis[1-oxaspiro(2.5)oct - 6 - yl methyl]terephthalate is 7.7 %.

*Example 3.—Diepoxide of 4-methylenecyclohexanemethyl adipate*

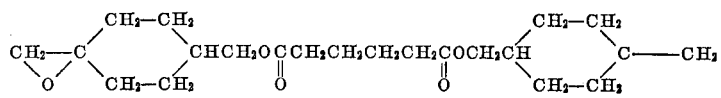

A mixture of 4 - methylenecyclohexanemethyl adipate (650 g., 1.8 moles) and sodium acetate (35 g.) was stirred while adding dropwise 696 g. (3.7 moles) of a 40% acetic solution of peracetic acid over a period of 2 hours. External cooling was used when necessary to keep the temperature at 20°–25° C. during the peracetic acid addition and for 3 hours thereafter. More than 95% of the peracetic acid was consumed during this period. Chloroform (1 l.) was then added and the mixture was washed with 1500 ml. water. The organic layer was neutralized with 5% sodium bicarbonate solution and was then washed with two-1200 ml. portions of water. The chloroform solution was dried over sodium sulfate. The chloroform was then distilled under reduced pressure to give 656 g. of a white waxy solid; oxirane oxygen (found): 5.6% (calcd.): 8.1%.

Example 4.—Diepoxide of 4-methylenecyclohexanemethyl phthalate

The epoxidation of 4 - methylenecyclohexanemethyl phthalate with peracetic acid was carried out using the procedure described in Example 2. From 495 g. of the unsaturated ester, 491 g. of a viscous colorless oil was obtained. The oxirane oxygen content of the product was 5.9%.

Example 5.—Diepoxide of 4-methylenecyclohexanemethyl 1,4-cyclohexanedicarboxylate Using the procedure disclosed in Example 2, 4-methylenecyclohexanemethyl 1,4-cyclohexanedicarboxylate (57 g.) was epoxidized with 40% peracetic acid (60 g.). The product (55 g.) was a white waxy solid having an oxirane oxygen content of 6.4%; oxirane oxygen (calcd.): 7.6%.

The above Examples 2, 3, 4 and 5 are to be considered as illustrative of the other epoxides of the invention. A suitable diluent may or may not be used. Peracetic acid in an excellent epoxidizing agent, but other peroxy compounds, which are well known in the art, may also be used. The following structures represent other epoxides that were prepared by these procedures:

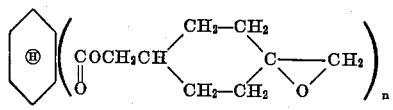

where $n = 2, 3,$ or $4$.

Examples of this group are the epoxidized methylenecyclohexanemethyl esters of cyclohexane polycarboxylic acids such as 1,2 - cyclohexanedicarboxylic acid, 1,2,3-cyclohexanetricarboxylic acid and 1,2,3,4 - cyclohexanetetracarboxylic acid. The symbol ⒽⒶ indicates that the ring is fully hydrogenated.

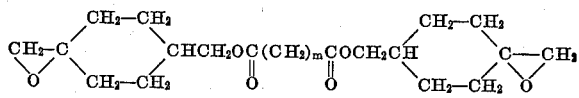

where $m = 0$–$10$.

These esters are derivatives of alkanedioic acids and are illustrated further, for example, with succinic and pimelic acids.

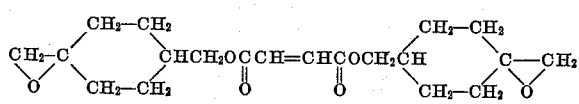

The epoxidized methylenecyclohexanemethyl esters of maleic and fumaric acids comprise this group.

In addition to the above compounds, the epoxidized 4 - methylcyclohexanemethyl esters of 4,5 - epoxy - 1,2-cyclohexanedicarboxylic acid and diglycolic acid are included.

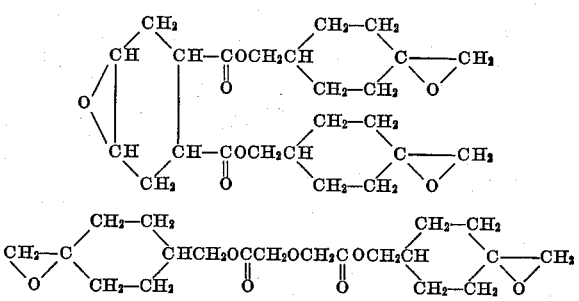

Example 6

The diepoxide from 4 - methylenecyclohexanemethyl terephthalate (41 g.) was added to maleic anhydride (7 g.) heated to a temperature of 80°–90° C. 1,2,6-hexanetriol (0.9 g.) was then added and the mixture was heated to 115° C. A hard infusible resin was obtained after heating at 115° C.

Example 7

The diepoxide from 4 - methylenecyclohexanemethyl adipate (40 g.) was mixed with 3.2 g. diethylenetriamine. The mixture was cured by heating at 115°–120° C. for 12 hours. A hard infusible resin was obtained.

Example 8

The diepoxide compound (39.5 g.) used in Example 7 was mixed with maleic anhydride (6.9 g.) and 1,2,6-hexanetriol (1.0 g.). This mixture cured to a tough composition after heating for 18 hours at 120° C.

Example 9

A mixture of the diepoxide from 4 - methylenehexanemethyl 1,4 - cyclohexanedicarboxylate (60 g.), phthalic anhydride (15 g.) and 1,2,6 - hexanetriol (1.5 g.) was heated at 130° C. for 12 hours and then at 180° C. for 4 hours. A hard infusible resin was produced.

In place of the maleic anhydride, there can be substituted in above Examples 6 and 8 any other of the mentioned anhydrides such as phthalic anhydride, 1,2-cyclohexanedicarboxylic anhydride, etc. and any of the other mentioned polyols to give generally similar epoxy resins. In place of the diethylenetriamine, there can be substituted in above Example 7 any other of the mentioned polyamines to give resinous epoxy products of generally similar characteristics. All of the epoxy resins of the invention, as previously indicated, are especially valuable for coating compositions, potting compositions and casting materials. For example, when employing these resin compositions as coating materials, the compositions which are in liquid form are applied to the surface desired to be coated and cured under the influence of either heat or catalyst or both. Polymerization and cross-linking occur with the result that a hard, infusible and insoluble coating is produced. Similarly, when these resin compositions are applied as potting compositions or as casting materials, the same phenomenon of polymerization and cross-linking takes place to produce the desired hard, infusible material required. The epoxy resin compositions produced from the epoxides of this invention also have excellent adhesive properties, adhering particularly well to surfaces of glass and various metals.

The invention has been described in detail with particular reference to preferred embodiments thereof, but it will be understood that variations and modifications can be effected within the spirit and scope of the invention as hereinabove described and as defined in the appended claims.

What we claim is:

1. An epoxide selected from the group consisting of those represented by the following general formulae:

$$R(COOA)_n$$
$$R_1(COOA)_n$$
$$R_2(COOA)_2$$
$$R_3(COOA)_2$$
$$R_4(COOA)_2$$

and $$R_5(COOA)_2$$

wherein $n$ represents an integer of from 2–4, each A represents the group:

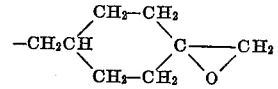

R represents a polyvalent benzene nucleus, $R_1$ represents a polyvalent cyclohexane nucleus, $R_2$ represents a 7-oxabicyclo[4.1.0]heptane nucleus, $R_3$ represents a divalent alkylene group of from 2–12 carbon atoms, $R_4$ represents a —$R_6$—O—$R_6$— group wherein each $R_6$ represents a divalent alkylene group of from 2–4 carbon atoms and $R_5$ represents a —CH=CH— group with a material selected from the group consisting of a polyamine in the proportions to provide 0.7 to 2.0 amino hydrogens per epoxy group contained in said epoxide, and a dibasic acid anhydride admixed with from about 1-2% by weight thereof of a polyol, in the proportions of from 0.5 to 3.0 of said anhydride carbonyl groups per epoxy group contained in said epoxide.

2. The resin obtained by heating at from 50–200° C. a mixture of the diepoxide of 4-methylenecyclohexanemethyl 1,4 - cyclohexanedicarboxylate with maleic anhydride containing from 1-2% of 1,2,6-hexanetriol, in the proportions of from 0.5 to 3.0 of said anhydride carbonyl groups per epoxy group in said diepoxide.

3. The resin obtained by heating at from 50–200° C. a mixture of the diepoxide of 4-methylenecyclohexanemethyl adipate with diethylenetriamine, in the proportions of from 0.7 to 2.0 of said amino hydrogens per epoxy group in said diepoxide.

4. The resin obtained by heating at from 50–200° C. a mixture of the diepoxide of 4-methylenecyclohexanemethyl adipate with maleic anhydride containing from 1-2% of 1,2,6-hexanetriol, in the proportion of from 0.5 to 3.0 of said anhydride carbonyl groups per epoxy group in said diepoxide.

No references cited.

JOSEPH L. SCHOFER, *Primary Examiner.*

J. KIGHT III, *Assistant Examiner.*

UNITED STATES PATENT OFFICE
CERTIFICATE OF CORRECTION

Patent No. 3,336,266

August 15, 1967

Wayne V. McConnell et al.

It is hereby certified that error appears in the above numbered patent requiring correction and that the said Letters Patent should read as corrected below.

Column 2, lines 17 to 20, the formula should appear as shown below instead of as in the patent:

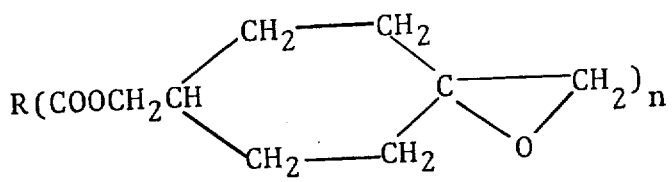

column 4, lines 53 to 59, the formula should appear as shown below instead of as in the patent:

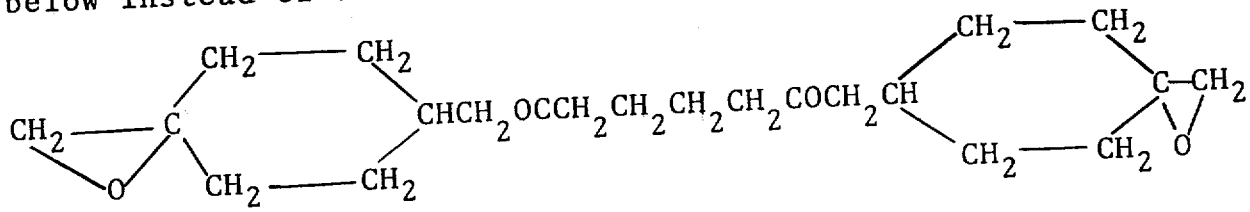

column 5, after line 23 insert the following:

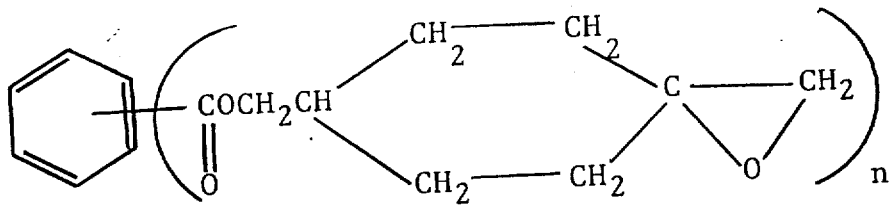

wherein n = 2, 3, or 4.

(2)

Examples of this group are the epoxidized methylenecyclohexane-methyl esters of o-phthalic, isophthalic, terephthalic, trimellitic, and pyromellitic acids.

Signed and sealed this 3rd day of December 1968.

(SEAL)
Attest:

EDWARD M. FLETCHER, JR.
Attesting Officer

EDWARD J. BRENNER
Commissioner of Patents